Oct. 14, 1947.  O. B. VETTER  2,429,083
CONTROL MECHANISM
Filed April 17, 1944  2 Sheets-Sheet 1
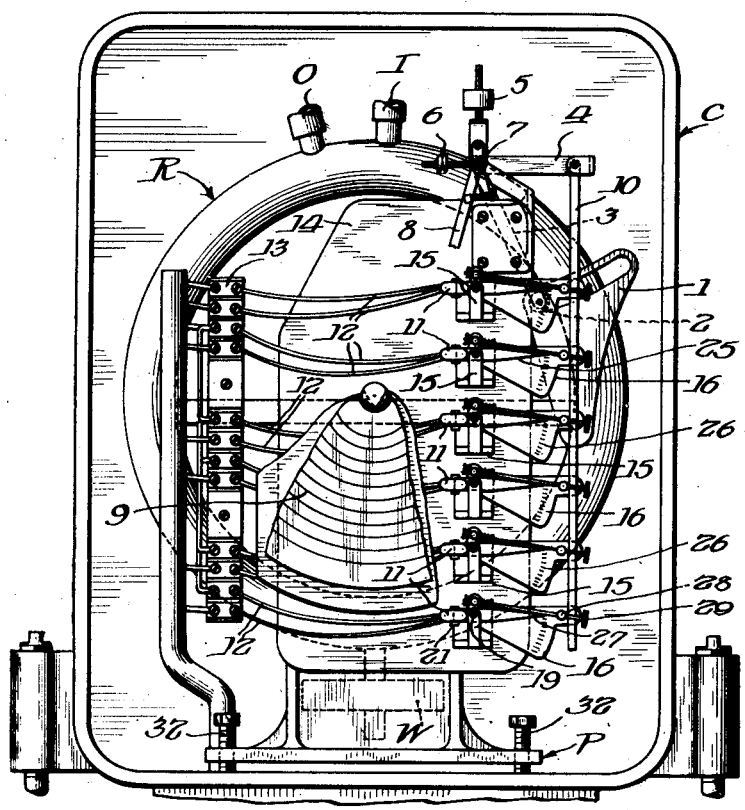
Inventor:
Otto B. Vetter:
By Albert I. Kegan
Atty.

Oct. 14, 1947.   O. B. VETTER   2,429,083
CONTROL MECHANISM
Filed April 17, 1944   2 Sheets-Sheet 2
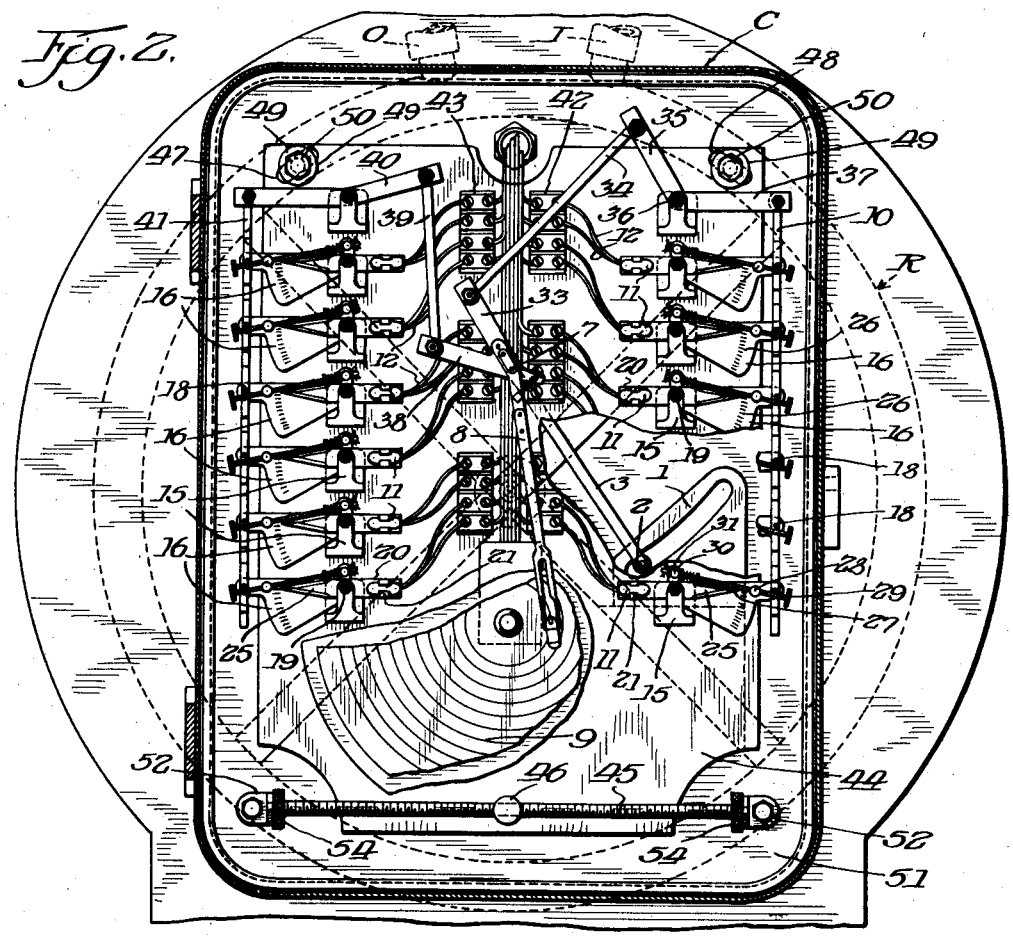
Inventor:
Otto B. Vetter
By Albert I. Kegan Atty.

Patented Oct. 14, 1947

2,429,083

UNITED STATES PATENT OFFICE 2,429,083

CONTROL MECHANISM

Otto B. Vetter, Chicago, Ill., assignor, by mesne assignments, to Hagan Corporation, Pittsburgh, Pa., a corporation of Pennsylvania Application April 17, 1944, Serial No. 531,358

6 Claims. (Cl. 200—56)

This invention relates to control mechanism, and more particularly to control arrangements which are responsive to variations in a condition which in turn is to be modified by operation of the control mechanism.

It is an object of the present invention to provide control mechanism including a movable member responsive to variations in the condition to be controlled, and in which the movement of said member operates to control one or more electric switches disposed in circuits which in turn exercise the desired control upon the variable condition, by suitably modifying the functioning of the apparatus.

The invention is particularly applicable to the control of a plurality of circuits designed to alter the conditions in a fluid pressure system, the functioning of which may be indicated and/or registered by a metering device such as a ring balance of the type disclosed in my Patent No. 2,280,325, for Flow and pressure measuring device, issued April 21, 1942. The invention may also be utilized to signal the conditions prevailing in the system, or to function as a safety interpreter of the controlled process.

It is a further object of the invention to combine an electric switch control system for a multiplicity of switches adapted to be operated and/or adjusted in unison but which nevertheless may be adjusted individually to vary the timing of the operation of the switches in dependence upon the specific needs of the factors controlled thereby.

It is an aim of the invention to so arrange these switches in a compact assembly which is easily accessible for inspection, maintenance, repair or modification of the circuits controlled by the switches.

It is a further object of the invention to combine a gang switch system with an indicating and/or recording instrument adapted to exhibit variable conditions such as pressure, differential pressures, flow rates, etc., in a compact and rugged manner so that the indicating and/or recording instrument not only performs its usual functions, but operates as well the series of switches in a system to affect in any desired manner the variable conditions normally evidencing themselves in the exhibited values.

It is a further object of the invention to provide a multiple electric switch assembly, the individual switches of which are conveniently adjustable to differentiate the time of operation of the respective switches from a common actuating instrumentality.

Other objects and purposes will appear from the more detailed description of the invention following hereinafter, taken in conjunction with the accompanying drawing, wherein Fig. 1 is a front elevation with certain parts cut away of a control device in accordance with the present invention;

Fig. 2 is a front elevation of a portion of a second embodiment of the invention;

Fig. 3 is a top view of one of the electric switch assemblies forming part of the system; and Fig. 4 is a front view of the switch assembly.

In Fig. 1 is shown a casing C containing normally a pedestal P supporting a ring balance R provided with an inlet I, an outlet O, and a counterweight W which is adapted to experience angular movement in response to changes in pressure or differential pressure due to flow of fluid, variations in the level of a fluid, variations in specific gravity, etc. The operation of the ring balance mechanism is fully explained in my Patent No. 2,280,325. The angular movement experienced by the ring balance is suitably indicated and/or recorded, as for example by the cooperation of the stylus 8 with the rotating chart 9. The invention aims to combine with the foregoing assembly, or an assembly functioning in a similar manner, one or more tiltable electric switches of the "Mercoid" type, which are critically moved into circuit opening or closing position in accordance with the movement of the ring balance to control electric circuits in which they are disposed, which circuits are designed to exercise some control upon the variable factors which give rise to the condition indicated by the recording instrument. Thus, such control circuits may be used to operate driving machinery, actuate one or more relief valves, sound an alarm, or the like.

In the arrangement shown in Fig. 1, the rotary movement experienced by the ring body R is transmitted to the slotted cam 1. In said cam 1 rides the cam roller 2, which is supported between the prongs of the forked lever 3 on bearings therein. The angular deflection of said lever 3 is a measure of the function under test. It produces an equal deflection of the bell crank 4, which is equipped with the adjustable counterweights 5 and 6, and is pivoted at 7. The pen arm 8 is fixed to bell crank 4, and exhibits the deflection of the lever 3, as for example by recording the same upon the chart 9. One arm of the counterweighted bell crank 4 is connected to the upper end of the bar 10. One or more electric mercury switches 11 are controlled by the bar 10 to either open or close the circuits in which said switches are disposed and which are wired by suitable conductors 12 to a connector block 13 to which the several wires from the control circuits are brought for connection to the switches forming part of the control device in accordance with the present invention.

The switch assemblies are mounted upon a supporting panel 14 by means of mounting blocks 15 attached thereto. As is particularly apparent in Figs. 3 and 4, each of the switch assemblies includes a mounting block 15, a threaded bearing housing 19 therein carrying a needle shaft 17, and a sector-shaped plate 16 mounted at one end thereof upon said needle shaft 17. Said plate 16 is provided with pintles 18 at the end thereof opposite said shaft 17, for engagement with the vertical bar 10. A holder 20 for the mercury switch is also pivotally mounted upon the needle shaft 17. Spring jaws 21 are provided upon one end of the holder for releasably retaining a mercury switch 11. Said switch 11 has two terminals 22 at one end thereof leading from conductors 12, and a mass of electrically conducting liquid 23 in the envelope 24 to selectively bridge the terminals 22 when the switch is tilted so as to bring the mass 23 into contact therewith, or to break the circuit when said mass 23 is remote from the spaced terminals 22, as shown in Fig. 4. In most cases the electrically conducting mass is mercury.

The switch holder 20 is provided with a pointer 25 which cooperates with the scale 26 on the sector-shaped plate 16 to facilitate setting the switch at a desired inclination relative to said plate 16. The degree of inclination is suitably varied by the actuation of a threaded bolt 27 which passes through a threaded post 28 on plate 16 and terminates in a knurled knob 29. Said bolt 27 is rotatably mounted in the pin 30 which protrudes from the lever arm 31 of the switch holder 20. Thus said holder 20 may be rotated upon the needle shaft 17 by turning the knurled knob 29, thereby varying the distance between the post 28 and the pin 30. While Fig. 4 illustrates a scale graduated from 0 to 100, it is obvious that the zero position of the switch holder 20 may be preselected at will, and the scale 26 graduated accordingly to facilitate setting the control system so that any given circuit will open or close at any desired deflection of the ring R, transmitted to the switch 11 through the vertical bar 10.

The pedestal P is adjustable upon the leveling screws 32. Adjustment of said screws 32 serves to tilt all the switch assemblies in unison, thereby providing a simple method for setting the zero position relative to which all the switches operate.

From the foregoing description of the apparatus, it is apparent that each switch assembly can be set to make or break a circuit at any desired position of the ring R, entirely independent of the operation of any of the other switches in the system.

Fig. 2 illustrates an alternative arrangement for transmitting the movement of the ring balance or like responsive device to a plurality of electric switches. In this arrangement, the motion of the ring R is transmitted through the cam 1 and lever 3 to the crank arm 33, and thence through link 34 to one arm 35 of a bell crank pivoted at 36. The other arm 43 of said bell crank is jointed to the upper end of vertical bar 10. If desired, the lever arms 33, 35 and 37 may be made equal, thereby securing a 1 to 1 ratio of mechanical transmission. Where greater sensitivity of control is desired, a different lever ratio may be selected. In some embodiments of the invention, for example, a 30° maximum angular deflection of the cam lever 3 is stepped up to a 60° deflection of the switch plates 16.

If a number of control circuits is desired larger than can conveniently be disposed in a single bank, a second bank may be provided as shown in Fig. 2, controlled through the crank arm 38, link 39, bell crank 40, and vertical bar 41. Said bar 41 is operatively connected with the switch sector plates 16 in the same manner as bar 10 is connected to the sector plates operated by it. In this modification, it is convenient to mount the connector blocks 42 and 43 near the center of the casing, and to run the wiring conductors therefrom through an opening in the back of the casing.

In Fig. 2, the switch banks are shown mounted upon the switch panel 44, which is pivoted at the center and provided with slotted holes 47, 48. By means of the anchoring bolts 50 passing through said holes 47, 48, and the friction washers 49 thereon, said panel 44 is adjustably secured to the stationary mounting plate 51. Anchored to said mounting plate 51 are the angle brackets 52, which form bearings for the long adjusting screw 45. Said screw 45 is threaded through the trunnion 46 fixed to switch panel 44. The thumb adjusting nuts 54 act as thrust bearings, so that adjustment of screw 45 tilts the switch panel 44, thereby tilting all the switch assemblies in unison, as for adjustment of the zero position thereof relative to the null position of the ring body R.

An inherent advantage of the instant invention is that the number of switch banks can be increased indefinitely, simply by fixing an additional crank arm to the cam lever 3 for each additional bank of switches, and connecting each bank with the corresponding crank arm through a link, bell crank, and switch operating bar, in the manner shown and already described with respect to the switches connected to bars 10 and 41. If desired, the switches may be arranged in horizontal rows and connected to horizontally disposed switch operating bars. For this arrangement, the crank arms 33, 38 and the bell cranks linked thereto would ordinarily be constructed at right angles to the positions shown in Fig. 2. As a matter of fact, the mechanism of the present invention makes it possible to align the switch banks in rows arranged at any desired angle to the horizontal, or in any convenient combination of vertical, horizontal and intermediate inclinations.

While the invention has been disclosed by detailed descriptions of particular embodiments thereof, it will be apparent that the present invention embraces a substantial body of equivalents, and I therefore do not limit myself by any of the details hereinabove recited, except as expressly included in the appended claims, which define my invention.

I claim:

1. Control mechanism comprising a member positioned in accordance with the magnitude of a variable, a cam for extracting a function of the movement of said member, a first lever actuated by said cam, a counterweighted second lever pivoted coaxially with said first lever, a switch operating bar connected with said second lever, a supporting panel, means for tiltably adjusting said supporting panel, and a plurality of switch assemblies on said panel, each of said switch assemblies comprising a plate pivoted at one end to said supporting panel and jointedly connected to said bar at the opposite end thereof, a holder pivotally connected to said plate coaxially with the pivotal mounting of said plate on said panel, a liquid electric switch in said holder, a lateral arm on said holder, a threaded post on said plate, and an adjustable connection between said arm and said post to vary the inclination of said holder with respect to said plate.

2. Control mechanism comprising an actuating member; a cam thereon; a first lever actuated by said cam; a plurality of crank arms pivoted coaxially with said first lever and fixed thereto; a plurality of bell cranks (one for each crank arm); a plurality of links, each linking one crank arm with one bell crank; a plurality of switch operating bars (one for each bell crank), each jointedly connected to an arm of a bell crank remote from the arm thereof attached to a link; a supporting panel; and a plurality of switch assemblies on said panel, each of said assemblies being jointedly connected to one of said switch operating bars, and being adapted to complete an electric circuit when tilted into a predetermined critical position.

3. A controlling device comprising mechanism responsive to fluctuations in the condition of a variable, a shaft rotated thereby, a crank arm fixed thereto, a supporting panel, a bell crank pivoted thereon, a link connecting one arm of said bell crank with the crank arm fixed to said shaft, a bar connected with the other arm of said bell crank, and a plurality of switch assemblies operated by said bar, each of said assemblies comprising a plate pivoted relative to said supporting panel and connected with said bar, a tiltable holder pivoted coaxially with said plate, means for controlling the position of said holder relative to said plate, means for indicating the position of said holder relative to said plate, circuit making means actuated by tilting said holder, and electrical connections terminating in said circuit making means.

4. A control device of the class described comprising a panel, a switch assembly mounted thereon, and an actuating bar for said switch assembly; said switch assembly comprising a plate pivoted at one end thereof on said supporting panel and jointedly connected to said bar at the opposite end thereof, a holder for a liquid electric switch pivotally connected to said plate coaxially with the pivotal mounting of said plate on said panel, an arm on said holder, a threaded post on said plate, and an adjusting screw connected with said arm and threaded through said post for varying the inclination of said holder with respect to said plate.

5. Control mechanism comprising a shaft, a graduated first member pivoted thereon, means on said first member for controlling the angular position thereof, a second member pivoted on said shaft, an indicator on said second member arranged to cooperate with the graduations on said first member to indicate the deflection of said second member relative to said first member, an electric switch critically responsive to slight tilting and tilted by deflection of said second member, an electric circuit opened and closed by said switch, and settable micrometer means connected with said first and second members for maintaining a predetermined angular relationship between them.

6. A ring-balance control mechanism comprising the combination with a hollow torus axially mounted for rotation and partially filled with liquid and divided into two compartments adapted to communicate respectively with different sources of pressure, and a deflecting cam of: a linkage actuated by a follower upon said cam; and a plurality of switch assemblies operated by said linkage, each of said assemblies comprising a pivotably mounted bracket member jointedly connected to said linkage, a tiltable clamp pivoted coaxially with said bracket member, means for adjusting the relative angular displacement between said clamp and said bracket member, means for indicating said relative angular displacement, and a liquid contact switch held in said clamp and actuated by the tilting thereof, whereby said switch may make or break an electrical circuit at a preselected deflection of said torus.

OTTO B. VETTER.

REFERENCES CITED

The following references are of record in the file of this patent:

UNITED STATES PATENTS

| Number | Name | Date |
| --- | --- | --- |
| 1,930,435 | Walker | Oct. 10, 1933 |
| 2,295,471 | Havenhill | Sept. 8, 1942 |
| 1,594,020 | Smith | July 27, 1926 |
| 1,953,019 | Le Gorre | Mar. 27, 1934 |
| 1,930,983 | Russell | Oct. 17, 1933 |